US012705448B2

(12) United States Patent
Wanger et al.

(10) Patent No.: US 12,705,448 B2
(45) Date of Patent: Aug. 11, 2026

(54) DETECTION METHOD AND APPARATUS, OBJECT MONITORING SYSTEM, COMPUTING DEVICE, AND STORAGE MEDIUM

(71) Applicant: WESTLAKE UNIVERSITY, Hangzhou (CN)

(72) Inventors: Thomas Cherico Wanger, Hangzhou (CN); Dong Sheng, Hangzhou (CN); Lishun Wang, Hangzhou (CN); Xin Yuan, Hangzhou (CN)

(73) Assignee: WESTLAKE UNIVERSITY, Hangzhou (CN)

( * ) Notice: Subject to any disclaimer, the term of this patent is extended or adjusted under 35 U.S.C. 154(b) by 150 days.

(21) Appl. No.: 18/607,745

(22) Filed: Mar. 18, 2024

(65) Prior Publication Data

US 2025/0190729 A1 Jun. 12, 2025

(30) Foreign Application Priority Data

Dec. 8, 2023 (CN) ........................ 202311686500.0

(51) Int. Cl.

| | |
|---|---|
| ***G06K 7/14*** | (2006.01) |
| ***G06T 7/70*** | (2017.01) |
| ***G06V 10/25*** | (2022.01) |
| ***G06V 10/46*** | (2022.01) |
| ***G06V 10/764*** | (2022.01) |

(52) U.S. Cl.

CPC .............. *G06K 7/1443* (2013.01); *G06T 7/70* (2017.01); *G06V 10/25* (2022.01); *G06V 10/46* (2022.01);

(Continued)

(58) Field of Classification Search

CPC ........................... G06K 7/1443; G06K 7/1417

See application file for complete search history.

(56) References Cited

U.S. PATENT DOCUMENTS

2010/0155464 A1* 6/2010 Swayn .................... G06K 7/14
235/375

FOREIGN PATENT DOCUMENTS

| | | | |
|---|---|---|---|
| CN | 109241808 A | 1/2019 |
| CN | 112541367 A | 3/2021 |

(Continued)

OTHER PUBLICATIONS

Crall et al., "BEEtag: A Low-Cost, Image-Based Tracking System for the Study of Animal Behavior and Locomotion", PLOS One, Sep. 2, 2015, 13 pages.

(Continued)

*Primary Examiner* — Thien M Le
*Assistant Examiner* — April A Taylor
(74) *Attorney, Agent, or Firm* — Oblon, McClelland, Maier & Neustadt, L.L.P.

(57) ABSTRACT

The present disclosure relates to a detection method and apparatus, an object monitoring system, a computing device, and a storage medium. The detection method includes acquiring an image containing a 2D code for an object, and inputting the image into a pre-trained multi-target detection model configured to detect multiple classes of detection targets including the 2D code. The method further includes at least one of: based on a detection box of the 2D code in the image, cropping out an image region of the determined detection box of the 2D code from the image, and recognizing the 2D code from the cropped image region; or, based on an actual size of the 2D code, a size of the 2D code in the image, and a position of the 2D code in the image, determining an actual position of the 2D code relative to an imaging device.

20 Claims, 9 Drawing Sheets

(52) U.S. Cl.
CPC .. *G06V 10/764* (2022.01); *G06T 2207/20132* (2013.01); *G06V 2201/07* (2022.01)

(56) References Cited

FOREIGN PATENT DOCUMENTS

| | | | |
|---|---|---|---|
| CN | 115496085 | A | 12/2022 |
| CN | 115630663 | A | 1/2023 |
| CN | 116721131 | A | 9/2023 |
| CN | 116757360 | A | 9/2023 |

OTHER PUBLICATIONS

Huo et al., "Research on QR image code recognition system based on artificial intelligence algorithm", Journal of Intelligent Sysems, 30, 2021, 13 pages.
Teoh et al., "Numerical Computation-Based Position Estimation for QR Code Object Marker: Mathematical Model and Simulation", Computation, 10, 147, 2022, 20 pages.
"MMDetection", OpenMMLab, Jun. 30, 2023, 7 pages, https://github.com/open-mmlab/mmdetection.
Shi, "Web-based indoor positioning system using QR-codes as markers", Nov. 5, 2020, 43 pages.
Wada et al., "Labelme: Image Polygonal Annotation with Python", Sep. 11, 2023, 6 pages, https://github.com/wkentaro/labelme.
"Barcode: Matrix (2D) barcodes", Wikipedia, Sep. 8, 2023, 34 pages, https://en.wikipedia.org/wiki/Barcode#Matrix_(2D)_barcodes.

* cited by examiner

DETECTION METHOD AND APPARATUS, OBJECT MONITORING SYSTEM, COMPUTING DEVICE, AND STORAGE MEDIUM

CROSS-REFERENCE TO RELATED APPLICATIONS

This application claims priority to Chinese Patent Application No. 202311686500.0, filed on Dec. 8, 2023, which is hereby incorporated by reference in its entirety.

TECHNICAL FIELD

The present disclosure relates generally to the field of detection, and more particularly to a detection method, a detection apparatus, an object monitoring system, and an associated computing device and non-transitory storage medium, wherein the object may be, for example, but not limited to, an insect such as a bumblebee.

BACKGROUND

A two-dimensional (2D) code is a form of information encoding, which usually uses a black-and-white pattern to embody a concept of "0" and "1" bit streams based on computer internal logic. A 2D code recording information about an object may be attached onto the object in order to detect the object. For example, in a common shopping scenario, a 2D code recording information of a product may be attached onto the product, and a cashier can use a code scanner to directly face the 2D code for scanning, so as to read the information of the product.

SUMMARY

According to a first aspect of the present disclosure, there is provided a detection method. The method comprises acquiring an image containing a 2D code for attaching onto an object and recording information about the object. The method further comprises inputting the image into a pre-trained multi-target detection model to process the image, the multi-target detection model being configured to detect multiple classes of detection targets including the 2D code. The method further comprises at least one of: based on a detection box of the 2D code in the image that is acquired from the multi-target detection model, cropping out an image region of the determined detection box of the 2D code from the image, and recognizing the 2D code from the cropped image region to read the information about the object that is recorded by the 2D code; or, based on an actual size of the 2D code, a size of the 2D code in the image, and a position of the 2D code in the image that is acquired from the multi-target detection model, determining an actual position of the 2D code relative to an imaging device for shooting the image.

According to a second aspect of the present disclosure, there is provided a detection apparatus. The apparatus comprises: an image acquisition module configured to acquire an image containing a 2D code for attaching onto an object and recording information about the object; a target detection module configured to input the image into a pre-trained multi-target detection model to process the image, the multi-target detection model being configured to detect multiple classes of detection targets including the 2D code; and at least one of a 2D code recognition module or a position determination module. The 2D code recognition module is configured to, based on a detection box of the 2D code in the image that is acquired from the multi-target detection model, crop out an image region of the determined detection box of the 2D code from the image, and recognize the 2D code from the cropped image region to read the information about the object that is recorded by the 2D code. The position determination module is configured to, based on an actual size of the 2D code, a size of the 2D code in the image, and a position of the 2D code in the image that is acquired from the multi-target detection model, determine an actual position of the 2D code relative to an imaging device for shooting the image.

According to a third aspect of the present disclosure, there is provided an object monitoring system. The system comprises: an imaging device configured to shoot an image for an object; and a processing device configured to perform the detection method according to the first aspect of the present disclosure to monitor the object based on the image shot by the imaging device.

According to a fourth aspect of the present disclosure, there is provided a computing device. The computing device comprises: one or more processors; and a memory storing computer-executable instructions which, when executed by the one or more processors, cause the one or more processors to perform the detection method according to the first aspect of the present disclosure.

According to a fifth aspect of the present disclosure, there is provided a non-transitory storage medium having stored thereon computer-executable instructions which, when executed by a computer, cause the computer to perform the detection method according to the first aspect of the present disclosure.

Other features of the present disclosure and advantages thereof will become more apparent from the following detailed description of exemplary embodiments of the present disclosure with reference to the accompanying drawings.

BRIEF DESCRIPTION OF THE DRAWINGS

The foregoing and other features and advantages of the present disclosure will become apparent from the following description of the embodiments of the present disclosure that are illustrated in conjunction with the accompanying drawings. The accompanying drawings, which are incorporated herein and form part of the specification, further serve to explain the principles of the present disclosure and to enable those skilled in the art to make and use the present disclosure. In the drawings.

Figure 1:
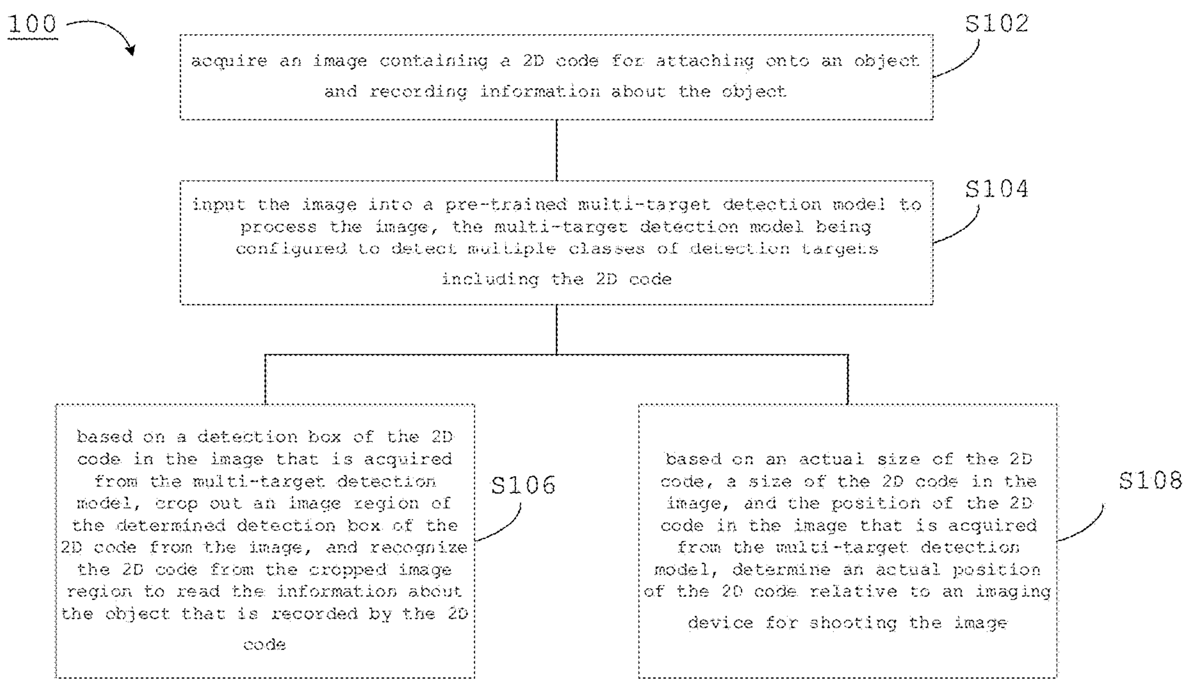
FIG. 1 illustrates a flowchart of a detection method according to some embodiments of the present disclosure.

Note that in the embodiments described below, sometimes same portions or portions having same functions are represented by jointly using a same reference numeral between different drawings, and their repetitive explanations are omitted. In some cases, similar items are represented using similar reference numbers and letters, and thus, once a certain item is defined in a drawing, it need not be discussed further in subsequent drawings.

For convenience of understanding, positions, sizes, ranges, and the like of structures shown in the drawings and the like sometimes do not represent actual positions, sizes, ranges, and the like. Therefore, the present disclosure is not limited to the positions, sizes, ranges, and the like disclosed in the drawings and the like.

DETAILED DESCRIPTION

Various exemplary embodiments of the present disclosure will be described in detail below with reference to the accompanying drawings. It should be noted that: relative arrangements, numerical expressions and numerical values of components and steps set forth in these embodiments do not limit the scope of the present disclosure unless specifically stated otherwise.

The following description of at least one exemplary embodiment is merely illustrative in nature and is in no way used as any limitation on this disclosure and its application or use. That is, the structure and method herein are shown in an exemplary way to illustrate different embodiments of the structure and method in the present disclosure. Those skilled in the art will understand, however, that they are merely illustrative of exemplary ways in which this disclosure may be implemented, rather than exhaustive ways. Furthermore, the accompanying drawings are not necessarily drawn to scale, and some features might be enlarged to show details of specific components.

Additionally, techniques, methods, and devices known to one of ordinary skill in the related art might not be discussed in detail but are intended to be part of the description where appropriate.

In all examples shown and discussed herein, any specific value should be construed as merely exemplary and not as limiting. Therefore, other examples of the exemplary embodiments may have different values. In some scenarios, an object to which a 2D code is attached might be located at a far place, or the 2D code might be miniature (for example, due to the fact that the object to which the 2D code is attached is small, or the 2D code is required to be inconspicuous, or the like), or the object to which the 2D code is attached might be in a moving state so that the 2D code might have various orientations, resulting in difficulty in recognition of the 2D code. For example, in an insect detection scenario, by providing, on an insect (e.g., a bumblebee, etc.), a 2D code recording information (e.g., a number unique to the insect, etc.) related to the insect, the insect may be marked in order to track and detect an activity of the insect. By capturing an image of the insect with an imaging device (e.g., a camera), the insect can be recognized by recognizing the 2D code in the image. Since the insect has a small size and the attachment of the 2D code had better not affect the activity of the insect itself, the 2D code for marking the insect tends to have a small size. For example, for a bumblebee, its 2D code typically has a size of 3 millimeters×3 millimeters or so, and such a 2D code might only occupy approximately 30 pixels×30 pixels in the captured image. In addition, because the activity of the insect makes the 2D code often fail to be in an optimal detection orientation relative to the imaging device (which is usually directly facing the imaging device), such a 2D code might be deformed in the captured image. Based on the above reasons, the recognition of the miniature moving 2D code is very difficult.

Taking a 5×5 2D code as an example, a 2D code in an image can be recognized by the following process: binarizing the image into a black-and-white image; searching for all closed contours in the black-and-white image, and picking out a closed contour approximate to a rectangle therefrom; fitting the picked-out closed contour by a rectangle, and drawing a 7×7 grid based on an outer edge of the fitted rectangle, thereby decoding the 2D code using a central 5×5 matrix. However, the step of "searching for all closed contours in the black-and-white image and picking out a closed contour approximate to a rectangle therefrom" is very inefficient because in a complex image, there are a large number of roughly rectangular regions, and a large portion of them are not actually 2D codes. Therefore, the above step wastes much time and computational power on undesired roughly rectangular regions, so that the detection speed is slow, resulting in difficulty in achieving real-time detection and tracking of the 2D code (and the object to which it is attached).

To this end, the present disclosure provides a detection method, which is capable of achieving real-time detection and tracking of a 2D code (and an object to which it is attached) with high efficiency and high accuracy. The detection methods according to various embodiments of the present disclosure will be described in detail below in conjunction with the accompanying drawings. It should be understood that an actual method might further include other additional steps, but in order to avoid obscuring the key points of the present disclosure, these other additional steps are not discussed herein and not shown in the drawings.

It should also be appreciated that although examples with an insect, or more specifically a bumblebee, as an object are illustrated herein in many places, this is not limiting. The detection method disclosed herein can be used for detecting any 2D code, particularly advantageously for detecting a miniature and/or moving 2D code, and can be further used for detecting an object to which the 2D code is attached, and a same-class object and an associated object of the object.

The same-class object described herein refers to an object that belongs to a same class. The associated object described herein refers to an object having some association. For example, when an object having a 2D code attached thereto is an insect, a same-class object may be an insect having no 2D code attached thereto. The insect having no 2D code attached thereto can include at least one of an insect to which a 2D code was originally attached but the 2D code is stained, damaged, or comes off, an offspring insect reproduced by a first-generation insect, or a foreign insect which joins an insect colony after a 2D code is attached to the first-generation insect. In addition, the associated object of the insect includes at least one of: an insect morphology (e.g., an insect egg, an insect larva, an insect brood or pupa, etc.) at various stages of a growth period, an insect nest and/or its constituent structure.

FIG. 1 illustrates a detection method 100 (which may be referred to as method 100 for short herein) according to some embodiments of the present disclosure, which includes steps S102 and S104, and may also include at least one of step S106 or S108.

At step S102, an image is acquired, which contains a 2D code for attaching onto an object and recording information about the object.

Figure 2A:
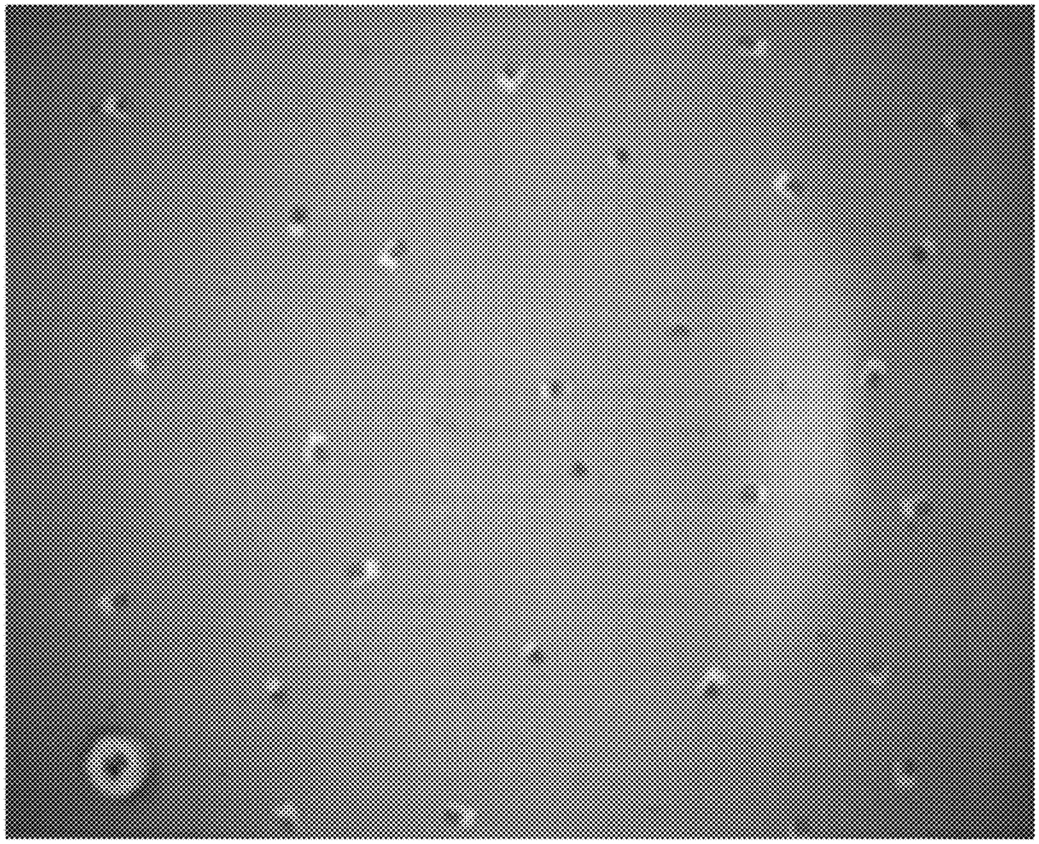
FIGS. 2A and 2B exemplarily illustrate bumblebee images captured by an imaging device, each bumblebee having a 2D code attached to its back.
Figure 2B:

For example, the image may be captured by an imaging device such as a camera. The acquired image may include one or more individual images, and may also include one or more images of an image frame sequence (e.g., from a video). For the purpose of non-limiting illustration, FIGS. 2A and 2B illustrate example images, which respectively contain a plurality of bumblebees, each bumblebee having a 2D code attached to its back that records information about the bumblebee (e.g., a unique number of the bumblebee, etc.). As can be seen from FIG. 2A, an image size of the 2D code occupies a very small proportion of the entire image, so that it is difficult to be recognized using a general code scanner. FIG. 2B may be the bumblebee image captured at a location closer to the bumblebees than FIG. 2A. Although an image size of the 2D code in FIG. 2B occupies an increased proportion of the entire image relative to FIG. 2A, it is still relatively small. In addition, as can be seen from FIG. 2B, since the bumblebees are in different postures, the 2D codes are in different orientations relative to the imaging device, such that a shape of the 2D code in the captured image deviates from its actual shape, which can be specifically embodied as, for the 2D code whose actual shape is a rectangle, an angle between adjacent edges of its shape in the captured image being unequal to 90°.

At step S104, the image is input into a pre-trained multi-target detection model to process the image, the multi-target detection model being configured to detect multiple classes of detection targets including the 2D code.

If the 2D code is recognized using the above method of picking out a rectangular closed contour, it is very likely that the recognition fails in the case of unclear, incomplete, and/or deformed display of the 2D code in the image. In contrast, if the 2D code is detected using the multi-target detection model, images containing 2D codes with various different degrees of clarity, completeness and deformation can be used as training samples in a training stage of the multi-target detection model, so that the trained model can also have a relatively good detection performance even for an unclear, incomplete and/or deformed 2D code in the image. Moreover, the multi-target detection model no longer needs "searching for all closed contours in the black-and-white image, and picking out a closed contour approximate to a rectangle therefrom", so that it will not waste time on an erroneous rectangular region, thereby improving the detection speed and facilitating real-time detection and tracking.

Figure 3:
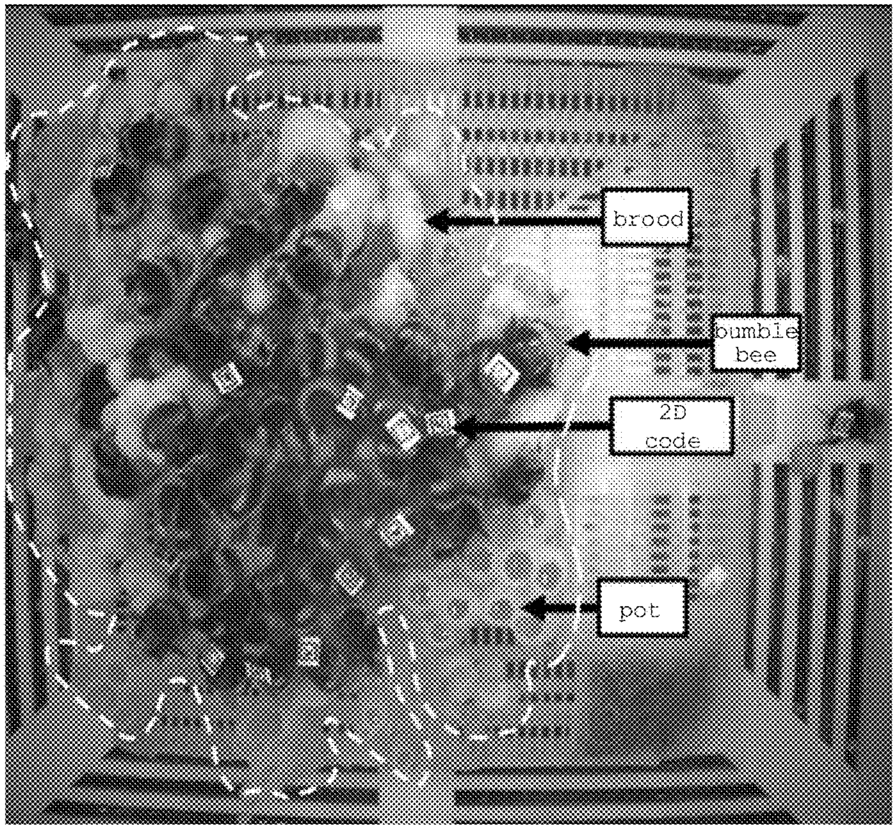
FIG. 3 exemplarily illustrates an image of a bumblebee nest captured by an imaging device.

In particular, in some embodiments, the multiple classes of detection targets may also include at least one of the object or the associated object. For example, for a bumblebee as an object, referring to FIG. 3, an associated object of the bumblebee may include a brood, a pot, and the like. If the above method of picking out a rectangular closed contour is used to recognize a 2D code and then a bumblebee to which it is attached, a bumblebee that originally had a 2D code attached thereto will become unrecognizable as the 2D code is stained, damaged or comes off. Moreover, in an actual bumblebee colony, offspring bumblebees are constantly born, and foreign bumblebees might join the colony, so that these bumblebees are not marked using 2D codes and therefore are also unrecognizable. Therefore, the amount of data that can be obtained by recognizing a 2D code only using the above method of picking out a rectangular closed contour is very limited. Furthermore, in addition to the bumblebee individuals, as shown in FIG. 3, in the bumblebee colony, there is a lot of other important visual information, such as the quantity of broods, pots or other nest structures in the nest. These important information reflects the development of the bumblebee colony, but these associated objects are often not marked with 2D codes and cannot be obtained by the recognition of the 2D codes attached onto the objects. Therefore, when the multiple classes of detection targets further include at least one of the object (the bumblebee) or the associated object (the brood and the pot), more important information can be obtained in addition to the information contained in the 2D code.

The multi-target detection model may be configured to output one or more of a class, a position, and a detection box of a target detected in the image. In order to improve the detection accuracy, it can be required in the training stage that multi-task learning of class regression, position regression, and detection box regression are performed on all the detection targets. In order to improve the detection speed and save the computational power, it can be selected in an inference stage that detection box(s) of certain detection target(s) is (are) not calculated, for example, a detection box of a 2D code can be calculated, whereas detection boxes of an object and an associated object are not calculated. Compared to the detection box, the calculation of the class and position of the target consumes less time and computational power, so that it can be selected in the inference stage that the classes and positions of all the detection targets are calculated.

In some embodiments, the method 100 includes, in the case where the image further contains the object to which the 2D code is attached, determining a position of the 2D code in the image that is acquired from the multi-target detection model as a position of the object in the image. In this case, the multi-target detection model only needs, in the inference stage, to calculate a class of the object without calculating its position. In some embodiments, in the case where the multiple classes of detection targets further include the object, the method 100 may also include, in the case where the image further contains the object to which the 2D code is attached, further acquiring a position of the object in the image from the multi-target detection model. In some embodiments, in the case where the multiple classes of detection targets further include the object, the method 100 may include, in the case where the image further contains the object having no 2D code attached thereto, further acquiring a position of the object having no 2D code attached thereto in the image from the multi-target detection model. In these cases, the multi-target detection model calculates the class and position of the object in the inference stage. In some embodiments, in the case where the multiple classes of detection targets further include an associated object of the object and the associated object has no 2D code attached thereto, the method 100 may further include, in the case where the image further contains the associated object, further acquiring a position of the associated object in the image from the multi-target detection model. In this case, the multi-target detection model calculates the class and position of the associated object in the inference stage.

Compared to detecting the 2D code with a single-target detection model, detecting the 2D code with the multi-target detection model can achieve improved detection accuracy. On one hand, there are a large number of training samples of the multi-target detection model, so that for a problem of insufficient training data in a certain task (for example, a 2D code detection task), training can also be performed with the help of other tasks, which can achieve an improved generalization performance. On the other hand, especially when there is a correlation between the multiple classes of detection targets (e.g., the 2D code, the object, the associated object), different detection tasks can better perform joint learning to mine information shared between the different detection tasks. For a certain task (for example, a 2D code detection task), whether or not a learned feature is really effective can be determined by other tasks, a feature difficult to be learned by the task can be learned by other tasks, and the task can be made to focus on information expression on which other tasks also focuses.

Figure 4:
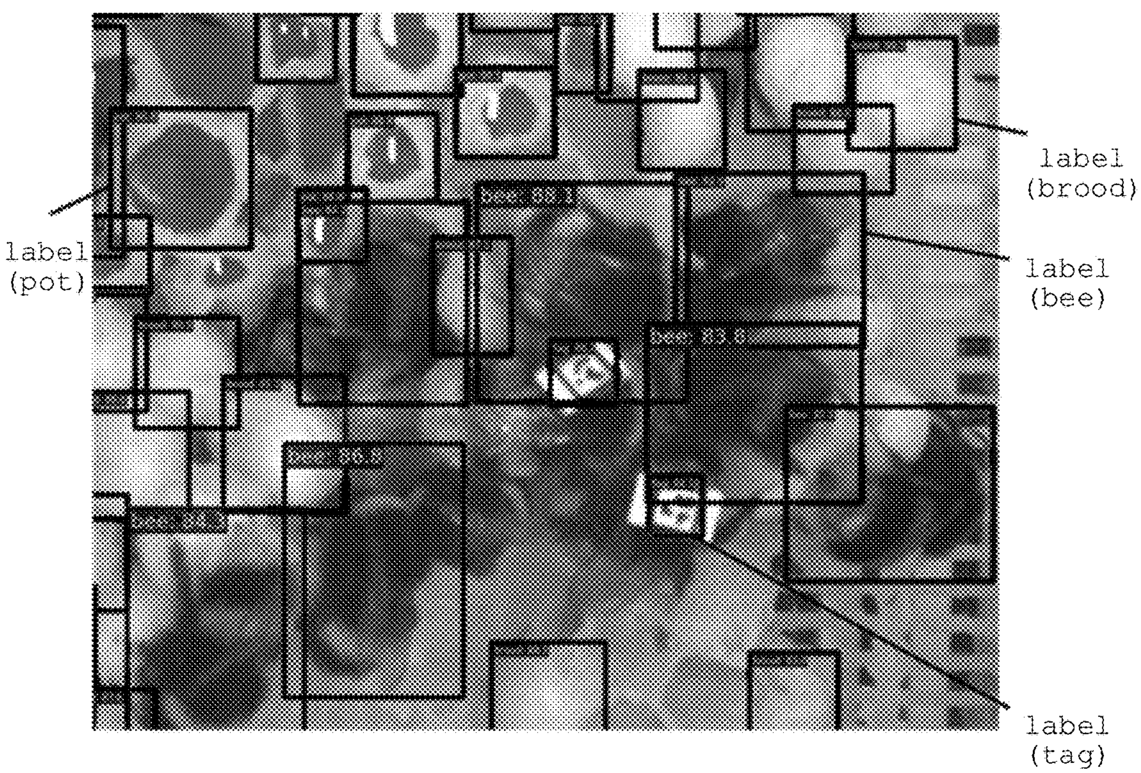
FIG. 4 exemplarily illustrates a training image for a multi-target detection model according to some embodiments of the present disclosure.
Figure 5:
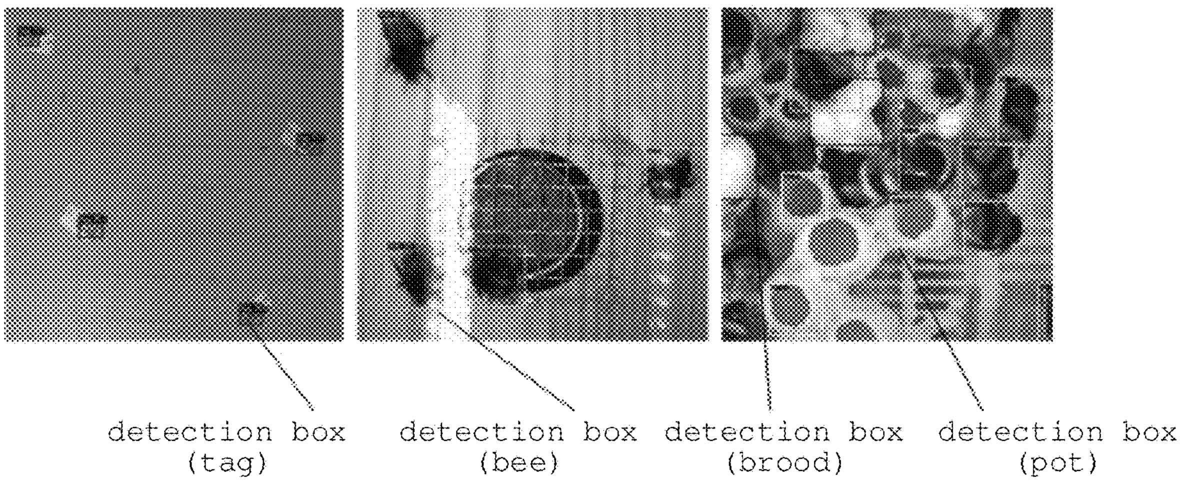
FIG. 5 exemplarily illustrates detection results of a multi-target detection model according to some embodiments of the present disclosure.

For the purpose of non-limiting illustration, FIG. 4 exemplarily illustrates a training image for training a multi-target detection model, which is labeled by boxing a 2D code (tag), a bumblebee (bee), a brood (brood), a pot (pot) in the training image. The labeled training data may be used for training, for example, an MMDetection object detection model developed by OpenMMLab or an object detection model modified based on that model. It can be appreciated that other suitable multi-target detection models are also feasible. Accordingly, FIG. 5 exemplarily illustrates detection results of a multi-target detection model obtained by training 2000 epochs with a learning rate of 0.002, including detection boxes and degrees of confidence of 2D codes, bumblebees, broods, and pots. In FIG. 5, different classes of targets can have been clearly distinguished, and by further optimizing model training parameters and the number of training epochs, the detection ability of the model can be further improved.

Referring back to FIG. 1, at step S106, based on a detection box of the 2D code in the image that is acquired from the multi-target detection model, an image region of the determined detection box of the 2D code is cropped out from the image, and the 2D code is recognized from the cropped image region to read the information about the object that is recorded by the 2D code. For example, referring to FIG. 5, a part of image region may be cropped out according to the detection box calculated for the 2D code by the multi-target detection model, and then used for recognizing the 2D code.

In some embodiments, the recognizing the 2D code from the cropped image region to read the information about the object that is recorded by the 2D code comprises: performing binarization on the cropped image region; extracting a contour region of the binarized cropped image region; and reading, from the extracted contour region, the information about the object that is recorded by the 2D code.

The image region cropped out according to the detection box of the 2D code might have a very low resolution. As previously described, for example, for a bumblebee, its 2D code typically has a size of 3 millimeters×3 millimeters or so, so that such a 2D code might only occupy roughly 30 pixels×30 pixels in a captured image. The low resolution might reduce the recognition accuracy of the 2D code. Thus, in some examples, before binarization is performed on the cropped image region, interpolation may be performed on the cropped image region to increase the resolution of the cropped image region, and then binarization is performed on the interpolated cropped image region. The interpolation may be configured to increase the resolution of the cropped image region by 1 to 7 times, or by 2 to 5 times, or by 2 to 3 times. For example, in the case where the cropped image region is 30 pixels×30 pixels, it might be appropriate to enlarge it to 100 pixels×100 pixels by interpolation.

For example, interpolation may be performed using any suitable interpolation algorithm in the OpenCV library. For the purpose of non-limiting illustration, referring to FIG. 6, there are exemplarily illustrated a raw version (RAW), an interpolated version using nearest neighbor interpolation (INTER_NEAREST), an interpolated version using bilinear interpolation (INTER_LINEAR), an interpolated version using resampling using a pixel area relationship (INTER_AREA), an interpolated version using cubic interpolation based on a 4×4 pixel neighborhood (INTER_CUBIC), and an interpolated version using Lanczos interpolation based on an 8×8 pixel neighborhood (INTER_LANCZOS4), of an image region cropped out according to a detection box calculated for a 2D code by a multi-target detection model. The inventors have found that, in the case of using the interpolation algorithms alone, INTER_CUBIC and INTER_LANCZOS4 in the above five interpolation algorithms can each have higher recognition accuracy, but also consume certain time cost; in the case of using the interpolation algorithms in combination, the combination of INTER_LANCZOS4 and INTER_AREA in the combinations of the above five interpolation algorithms can have higher recognition accuracy and lower time cost.

Figure 6:
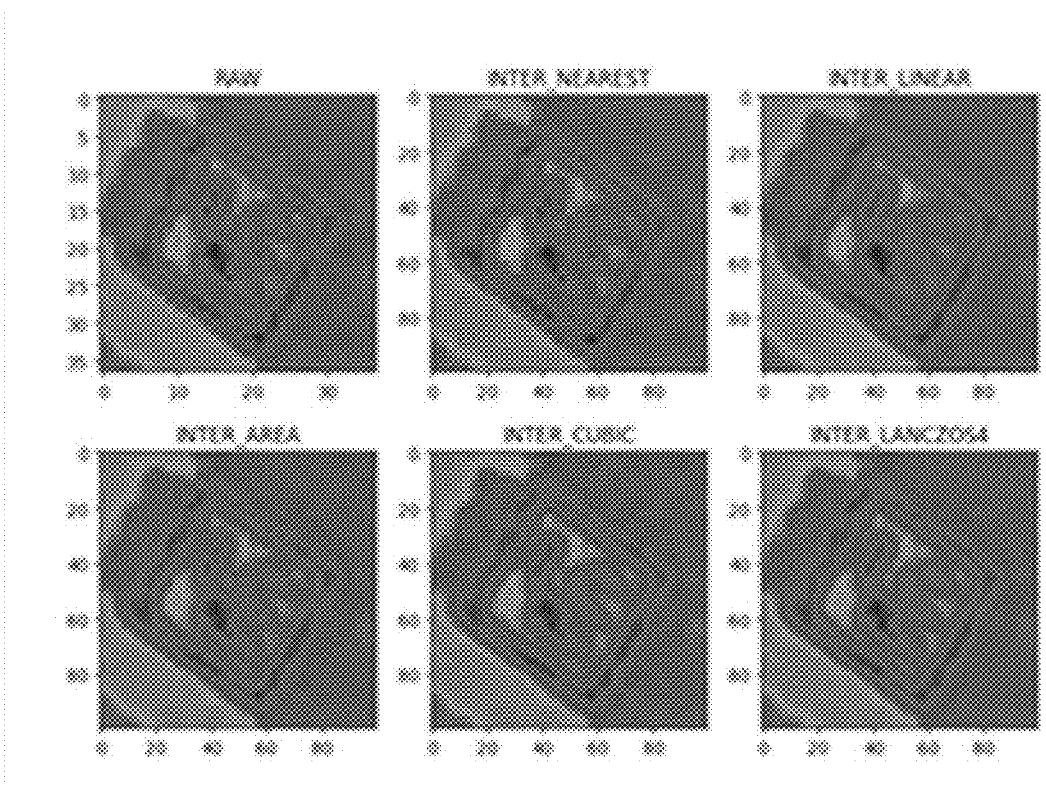
FIG. 6 exemplarily illustrates interpolation results of an image region of a determined detection box of a 2D code that is cropped out from an image according to some embodiments of the present disclosure.
Figure 7:
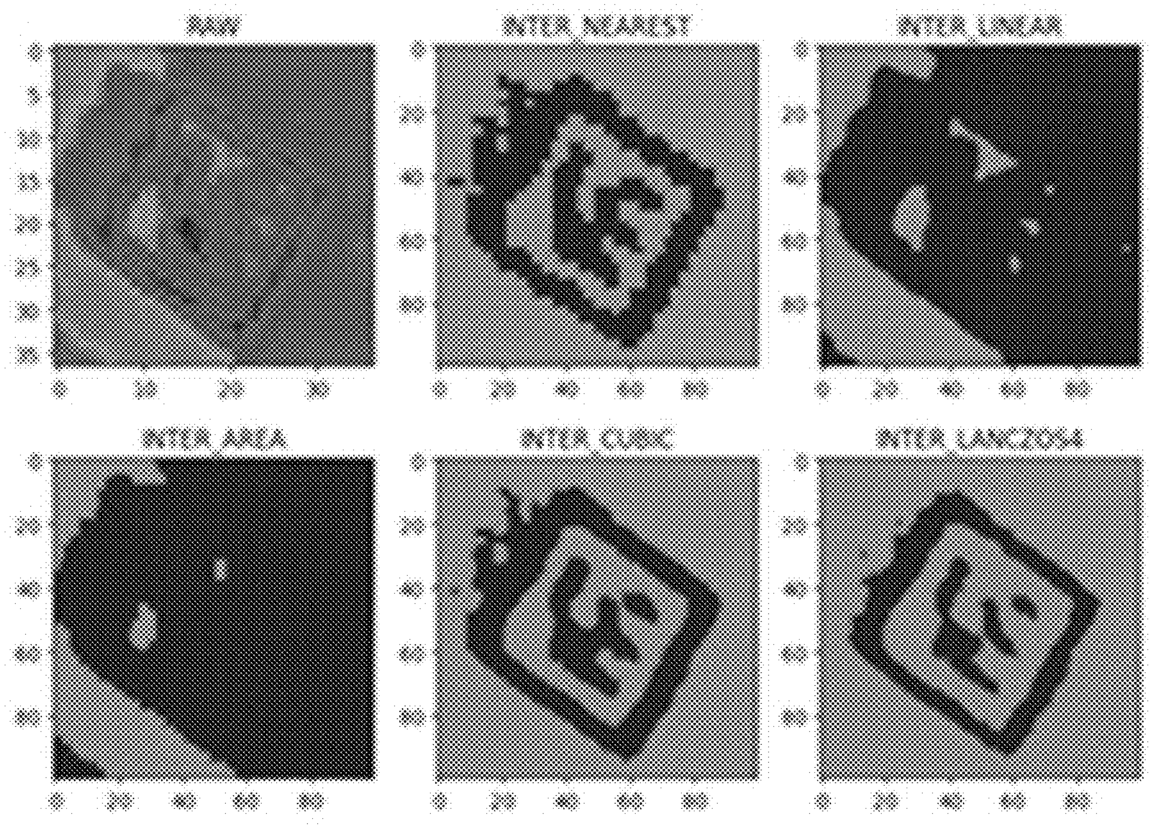
FIG. 7 exemplarily illustrates binarization results of the interpolation results of FIG. 6 according to some embodiments of the present disclosure.

In many cases, for example, in the case of complex illumination conditions (illumination angle and/or illumination intensity, etc.) when an image is captured, brightness of different positions in the image varies. Therefore, it might be inappropriate to binarize all pixels in the image region using a single threshold, e.g., it will occur that brighter parts contain too many white pixels after binarization while darker parts contain too many black pixels after binarization. Therefore, the image region may be binarized by using adaptive thresholding. Specifically, in some embodiments, performing binarization on the cropped image region may include: for each pixel in the cropped image region, determining a threshold for binarizing the each pixel based on values of pixels within a predetermined range around the each pixel, and binarizing the each pixel based on the determined threshold. For example, the pixels within the predetermined range around the each pixel may include 7 to 15 pixels, or 9 to 13 pixels, for example, 11 pixels. In some examples, the threshold for binarizing the each pixel may be determined based on an average or weighted average of the values of the pixels within the predetermined range around the each pixel. For example, a constant may be determined according to the illumination intensity when the image is captured, and then the threshold may be determined by subtracting the constant from the average or weighted average of the values of the pixels within the predetermined range around the each pixel. Exemplarily, when the illumination intensity when the image is captured is greater than a preset threshold illumination intensity, the constant can take a positive value; when the illumination intensity when the image is captured is less than the preset threshold illumination intensity, the constant can take a negative value; and when the illumination intensity when the image is captured is equal to the preset threshold illumination intensity, the constant may take a value of zero. For another example, weights for the values of the pixels in different angular directions relative to the each pixel within the predetermined range around the each pixel may be determined according to the illumination angle when the image is captured, and then the threshold may be determined as a weighted average of the values of the pixels within the predetermined range around the each pixel. For the purpose of non-limiting illustration, referring to FIG. 7, there is exemplarily illustrated results of binarization performed using adaptive thresholding on the raw version and the interpolated versions respectively obtained by the above five interpolation algorithms of the image region cropped according to the detection box of the 2D code as shown in FIG. 6.

Figure 8:
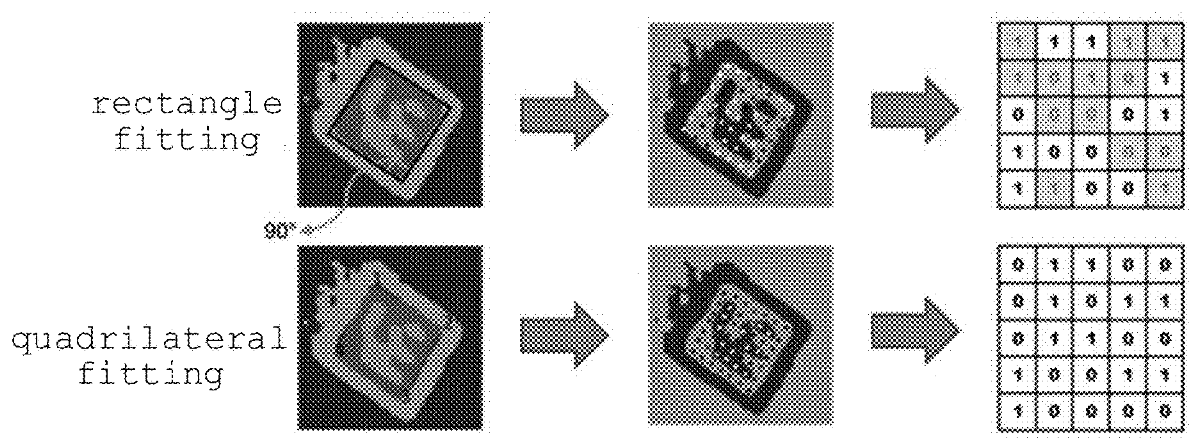
FIG. 8 exemplarily illustrates a contour extraction method by quadrilateral fitting according to some embodiments of the present disclosure, and a contour extraction method by rectangle fitting according to a comparative example of the present disclosure.

Conventionally, extracting the contour region of the binarized cropped image region may be performed by rectangle fitting. However, given that the 2D code is often not directly facing a field of view of the imaging device, the shape of the 2D code in the image is often not strictly rectangular, i.e., an angle between adjacent edges might not be equal to 90°. Referring to a rectangle fitting process shown in an upper half of FIG. 8, if a minimum bounding shape employed is a rectangle, a grid that is read might deviate from an actual grid of the 2D code, where shaded cells represent erroneous reading. To this end, in some embodiments, the extracting a contour region of the binarized cropped image region comprises: fitting the contour region of the binarized cropped image region by a quadrilateral; and using the fitted quadrilateral as the contour region extracted for the binarized cropped image region. In particular, an angle of each corner of the quadrilateral for fitting the contour region may be non-fixed. In particular, a distance between each edge of the quadrilateral for fitting the contour region and the contour region may be limited within a predetermined distance range. For example, the predetermined distance range may include 5 to 15 pixels, such as 10 pixels, within which the contour region may be accurately fitted using the quadrilateral. In a lower half of FIG. 8, a quadrilateral fitting process is illustrated, wherein a grid that is read accurately corresponds to the actual grid of the 2D code.

Figure 9:
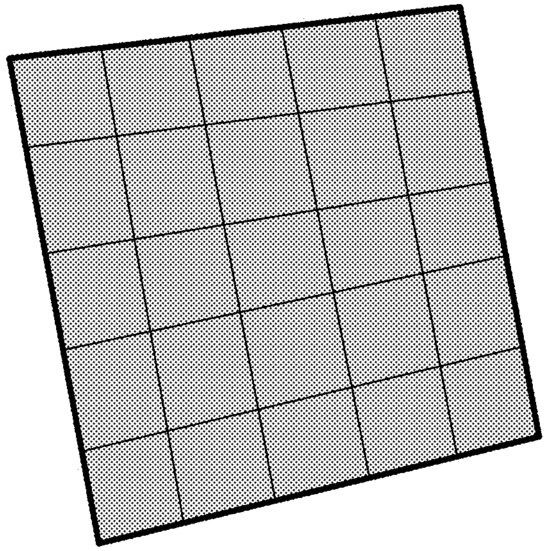
FIG. 9 schematically illustrates a grid employed for reading, from an extracted contour region, information about an object that is recorded by a 2D code, according to some embodiments of the present disclosure.

Further, the reading, from the extracted contour region, the information about the object that is recorded by the 2D code may include: applying an m-row n-column grid to the fitted quadrilateral according to an m-row n-column matrix to which the 2D code corresponds; for each cell in the m-row n-column grid, determining a binarization value of the each cell based on a value of a pixel falling within the each cell; determining the m-row n-column matrix to which the 2D code corresponds based on the binarization value of the each cell in the m-row n-column grid; and decoding the m-row n-column matrix to read the information about the object that is recorded by the 2D code, where m and n are positive integers. In some embodiments, the m-row n-column grid applied to the fitted quadrilateral may be obtained by connection lines between m equal points of a first pair of opposite edges of the quadrilateral and connection lines between n equal points of a second pair of opposite edges of the quadrilateral. For non-limiting illustrative purposes, referring to FIG. 9, assuming that a 2D code corresponds to a 5×5 matrix, a 5×5 grid can be applied to a fitted quadrilateral by connection lines between 5 equal points of two lateral edges and connection lines between 5 equal points of two longitudinal edges. For example, a value of a central pixel of each cell can be determined as a binarization value of the each cell, or a mode in values of all pixels of each cell can be determined as a binarization value of the each cell, or a binarization value of each cell can be determined using another suitable method.

Referring back to FIG. 1, at step S108, an actual position of the 2D code relative to an imaging device for shooting the image is determined based on an actual size of the 2D code, a size of the 2D code in the image, and a position of the 2D code in the image that is acquired from the multi-target detection model.

The position of the 2D code in the image that is acquired from the multi-target detection model may be, for example, but is not limited to, a central position of the 2D code in the image. It should be understood that for a target such as the 2D code, the position of the target in the image that is acquired from the multi-target detection model may depend on how a position of the target is labeled when the multi-target detection model is trained. The position of the target in the image, herein, may be referred to as an image position of the target, and a size of the target in the image may be referred to as an image size of the target.

The size of the 2D code in the field of view of the imaging device, i.e., the image size of the 2D code, roughly reflects an actual distance of the 2D code from the imaging device. The farther the 2D code is from the imaging device, the smaller the 2D code appears in the image captured by the imaging device. In addition, due to the fact that the 2D code is often not directly facing the imaging device, the angle between the adjacent edges of the 2D code in the image is often not equal to 90°, so that a difference between angles of four corners of the 2D code in the image may reflect an angle of a normal direction of the 2D code relative to a direction of a connection line between the 2D code and the imaging device. The size of the 2D code in the image can be directly measured, or reflected by the size of the detection box calculated for the 2D code by the multi-target detection model, and can also be determined using the fitted quadrilateral. However, the angles of the four corners of the 2D code in the image are difficult to be determined by the detection box, and need to be directly measured or determined using the fitted quadrilateral. It might be more advantageous to determine these angles using the fitted quadrilateral, but this results in having to determine the actual position of the 2D code in space after the 2D code has been recognized (at least after the quadrilateral is fitted).

To this end, based on Euclidean geometric space relations and pinhole imaging theory, assuming that a field angle of a 2D code in space relative to an imaging device is always a relatively small quantity, the present disclosure provides a method of estimating an actual position of a rectangular target such as a 2D code relative to an imaging device, which can be implemented based on an actual size of the 2D code, a size of the 2D code in an image, and a position of the 2D code in the image that is acquired from a multi-target detection model. In view of the above assumption, this estimation method is particularly advantageous for determining an actual position of a distant or miniature target relative to the imaging device.

Specifically, in some embodiments, the determining an actual position of the 2D code relative to an imaging device includes: using a reference image containing a reference object that is shot by the imaging device, based on an image size and an image position of the reference object in the reference image, and a field angle of the reference object relative to the imaging device that is determined by an actual size of the reference object and an actual position of the reference object relative to the imaging device, obtaining, by fitting, a proportion coefficient between the field angle of the reference object relative to the imaging device and the image size of the reference object as a first function of the image position of the reference object, and based on the image position of the reference object and the actual position of the reference object relative to the imaging device, obtaining, by fitting, an elevation angle of a connection line between the reference object and the imaging device relative to a projection of the connection line on a plane where the imaging device is located as a second function of the image position of the reference object; and determining an actual distance (L) of the 2D code relative to the imaging device based on the actual size of the 2D code and a field angle of the 2D code relative to the imaging device that is determined by the first function, the position of the 2D code in the image, and the size of the 2D code in the image, determining an elevation angle (θ) of a connection line between the 2D code and the imaging device relative to a projection of the connection line on the plane where the imaging device is located based on the second function and the position of the 2D code in the image, and determining an azimuth angle (ϕ) of the projection of the connection line on the plane where the imaging device is located based on the position of the 2D code in the image, thereby obtaining a spherical coordinate representation (L, θ, ϕ) of the actual position of the 2D code relative to the imaging device. In some examples, the fitting of the first and second functions may be performed using binary polynomial fitting and using a polar coordinate representation of the image position of the reference object, and the fitted first and second functions may be further represented as functions of a orthogonal coordinate representation of the image position of the reference object. Of course, other suitable fitting methods are also feasible. For example, the spherical coordinate representation (L, θ, $) of the actual position of the 2D code relative to the imaging device may also be transformed to an orthogonal coordinate representation (X, Y, Z). In addition, the size of the 2D code in the image can be directly measured, or determined by a size of the fitted quadrilateral, or approximately determined by the size of the detection box of the 2D code in the image that is acquired from the multi-target detection model. These sizes and the actual size of the 2D code may all be known. The size information may include, for example, at least one of length, width, or area.

Figure 10:
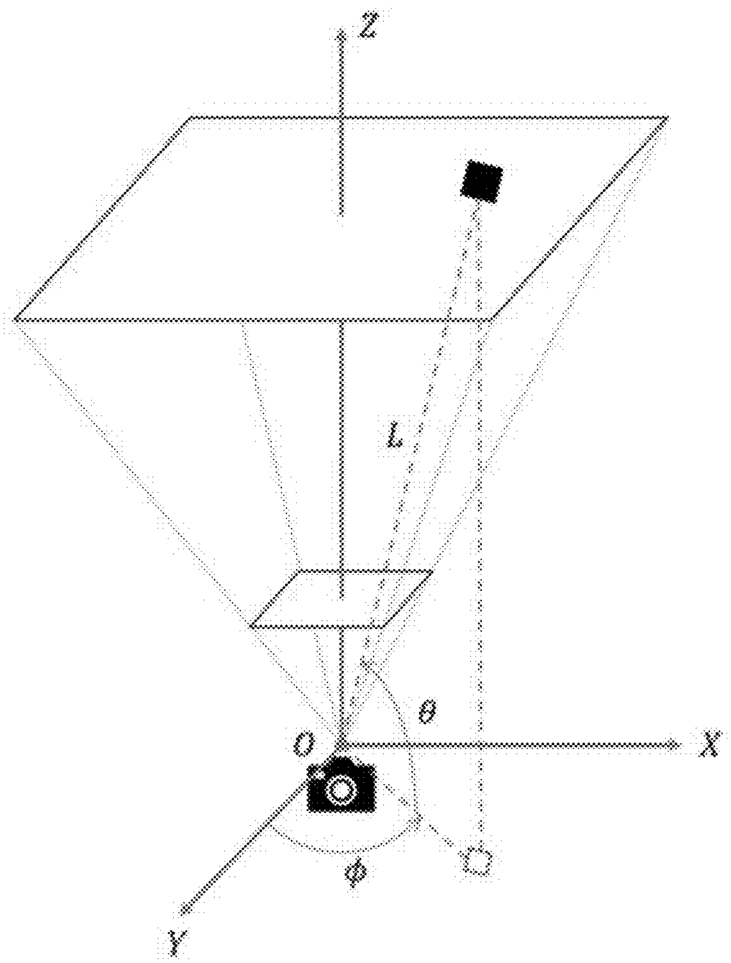
FIGS. 10 to 13 schematically illustrate a process for determining an actual position of a 2D code relative to an imaging device, according to some embodiments of the present disclosure.

For the purpose of non-limiting illustration, principles and processes for determining an actual position of a 2D code relative to an imaging device according to the present disclosure are described below in conjunction with FIGS. 10 to 13. As shown in FIG. 10, taking a position of the imaging device as an origin O, an orthogonal coordinate system (X, Y, Z) and a spherical coordinate system (L, θ, ϕ) are constructed. A plane where the imaging device is located is an XY plane, an actual distance of the 2D code relative to the imaging device is L, an elevation angle of a connection line between the 2D code and the imaging device relative to a projection of the connection line on the plane where the imaging device is located is θ, and an azimuth angle of the projection of the connection line between the 2D code and the imaging device on the plane where the imaging device is located is ϕ. ϕ can be determined directly from coordinates (x, y) of the position of the 2D code in the image, i.e., ϕ=arctan (x/y). Solutions to L and θ are relatively more complex.

Figure 11:
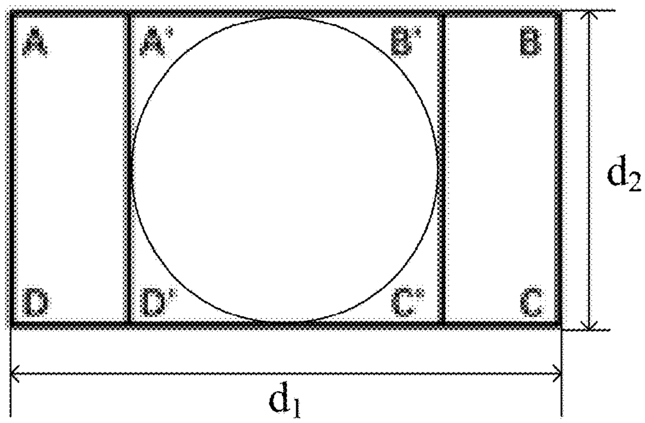

Referring to FIG. 11, the 2D code in real space may be represented as a rectangle ABCD with a width of $d_1$ and a length of $d_2$. A square A'B'C'D' may be defined in the rectangle ABCD, with its center coinciding with a center of the rectangle ABCD and its edge length equal to $d_2$. The rectangle ABCD appears as a quadrilateral in the field of view of the imaging device and not necessarily as a rectangle, while the square A'B'C'D' is deformed in the same proportion as the rectangle ABCD. A scaling of a quadrilateral (referred as a first quadrilateral), to which the rectangle ABCD corresponds in the field of view of the imaging device, to a quadrilateral (referred as a second quadrilateral), to which the square A'B'C'D' corresponds in the field of view of the imaging device, in a direction of the edge CD of the original rectangle ABCD is fixed, i.e. $d_1$:$d_2$. According to this scaling, the second quadrilateral may be drawn from the first quadrilateral (corresponding to the 2D code in the image) in the field of view of the imaging device. Subsequent estimations can all be performed according to the projection of the square A'B'C'D' into the second quadrilateral in the field of view of the imaging device.

Figure 12:
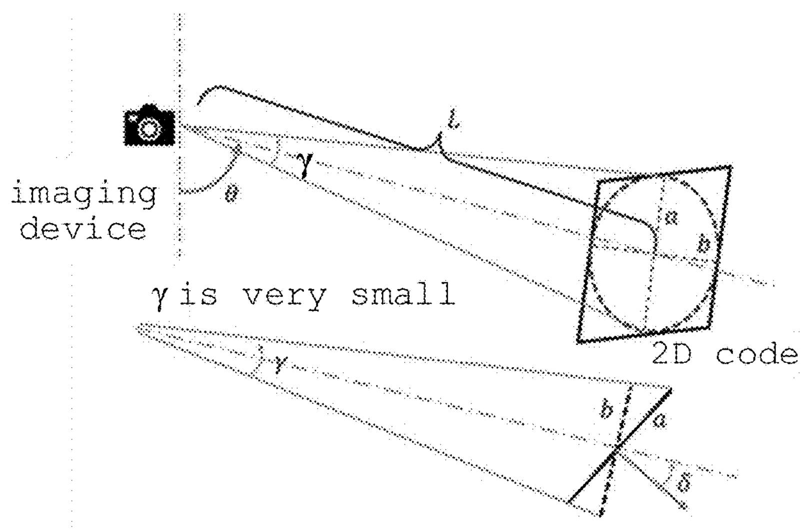

An inscribed circle is drawn in the square A'B'C'D', which is projected into an inscribed ellipse of the second quadrilateral in the field of view of the imaging device. Referring to FIG. 12, the inscribed ellipse has a major-axis of a and a minor-axis of b, a field angle of the inscribed ellipse relative to the imaging device is γ(γ<<1), and an angle of a normal direction of the inscribed ellipse relative to a direction of a connection line between a center of the inscribed ellipse and the imaging device is δ. According to space geometric relations, there is L×γ=a, so that L=a/γ. Therefore, as long as a and γ are known, the distance L between the center of the inscribed ellipse and the imaging device can be obtained. Since the inscribed ellipse is projected from the inscribed circle, a=$d_2$. Therefore, it simply needs to calculate the field angle γ, so that the distance L can be known. However, in practical applications, since it is often difficult to directly measure the field angle Y of the 2D code relative to the imaging device, it needs to be indirectly calculated through information in the image captured by the imaging device.

In the case where the position of the target is unchanged, the field angle γ of the target relative to the imaging device is in direct proportion to a size (e.g., length or width) of the region occupied by the target in the image of the imaging device. Taking the width w of the region occupied by the target in the image of the imaging device as an example for exemplary illustration below, there is γ=k×w. Therefore, when the proportion coefficient k is known, the field angle γ can be calculated by reading the width of the target in the image. Note that it can be understood that the field angle γ mentioned here as an example is a planar field angle, and this method can also be similarly applied to a stereo field angle ΔΩ of the inscribed ellipse relative to the imaging device, which is also in direct proportion to the size (e.g., area) of the region occupied by the target in the image of the imaging device, where $\Delta\Omega=L^2\times A$, $A=\pi ab$, and thus $L=(\Delta\Omega/\Pi ab)^{1/2}$, which is not further elaborated here.

However, due to the presence of image distortion, the proportion coefficient k varies at different positions in the image, that is, the proportion coefficient k is a function k=g(x, y) with respect to the image position (x, y). Imaging optical systems of imaging devices are different (for example, lens models are different), distortion degrees of images are also different, so that it is difficult to directly obtain an analytic solution of the function k=g(x, y) according to optical principles. Therefore, the present disclosure proposes solving the function k=g(x, y) for an imaging device using a method of calibration and fitting. In addition, as is clear from FIG. 12, the elevation angle θ is also a function θ=h(x, y) with respect to the image position (x, y). The function θ=h(x, y) may be solved concurrently in the process of solving the function k=g(x, y).

Figure 13:
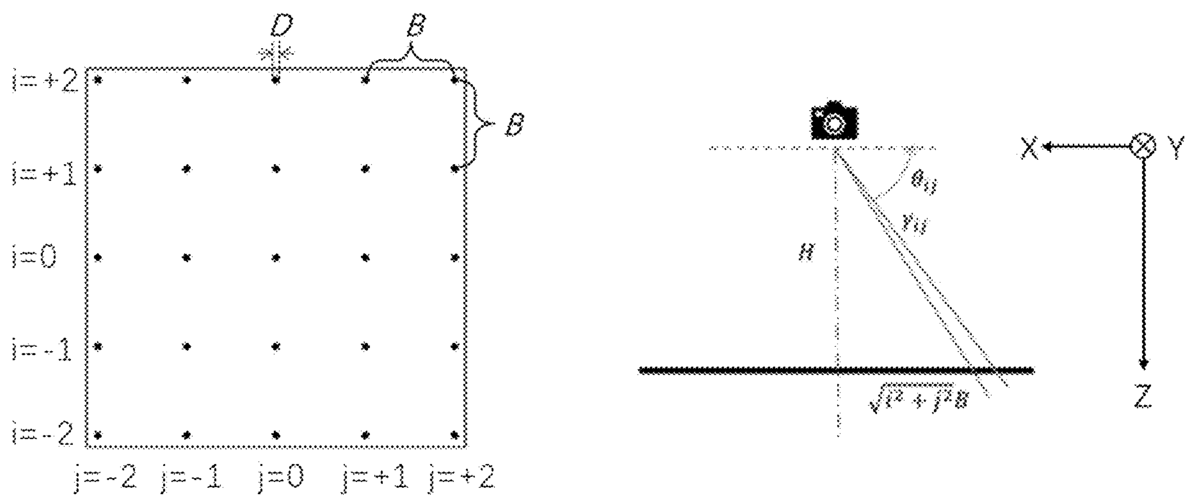

As a non-limiting specific example, a calibration paper (shown in a left half of FIG. 13) may be printed, which includes thereon an array of round dots having a diameter D of 3 millimeters and a spacing B of 100 millimeters. Each round dot may be used as a reference object. Here, the round dot, D and B are all exemplary rather than limiting. The round dot may be replaced with any other suitable shape, for example, a shape that is convenient for measurement or a shape that is same or similar to a target to be measured (e.g., a 2D code) may be employed. The value of D may be determined based on an actual size of a target (e.g., a 2D code), for example, D may be equal to an edge length of a 2D code. The value of B can be determined by considering fitting accuracy, and the smaller B, the more reference objects that can be arranged on the calibration paper, and the more data dots for fitting. As shown in a right half of FIG. 13, a focal length of the imaging device is adjusted and the calibration paper is placed at a focal plane directly in front of the imaging device, such that a central dot of the calibration paper is located at a center of a field of view of the imaging device. An actual distance H of the calibration paper to the imaging device in space is measured. In this example, the actual distance of the central dot of the calibration paper to the imaging device is equal to H. Each dot on the calibration paper can be denoted as a dot (i, j) in an i-th row and j-th column from the central dot of the calibration paper. For example, as shown in FIG. 13, the central dot of the calibration paper is (i=0, j=0), and its adjacent upper, lower, left, and right four dots are (i=+1, j=0), (i=−1, j=0), (i=0, j=−1), and (i=0, j=+1), respectively. An image of the calibration paper is captured with the imaging device as a reference image, and a pixel number $w_{ij}$ of a major-axis of each dot (i, j) in the reference image is measured (due to the presence of distortion, the dot might have changed from a round one to an elliptical one). Since the actual size (D=3 mm) of each dot (i, j) on the calibration paper and its actual position in space are known, a field angle of the dot (i, j) relative to the imaging device can be calculated as a ratio of the actual size of the dot (i, j) to the actual distance of the dot (i, j) to the imaging device, specifically denoted as $$\gamma_{ij} = \frac{D}{\sqrt{H^2 + (i^2 + j^2)B^2}}$$

Therefore, at the image coordinates $(x_{ij}, y_{ij})$ where the dot (i, j) is located, the proportion coefficient may be calculated as a ratio of the field angle of the dot (i, j) relative to the imaging device to the pixel number $w_{ij}$ of the major-axis of the dot (i, j), specifically denoted as $$k_{ij} = \frac{\gamma_{ij}}{w_{ij}} = \frac{D}{w_{ij} \cdot \sqrt{H^2 + (i^2 + j^2)B^2}}$$

Furthermore, the elevation angle may be calculated as an arctangent value of a ratio of the actual distance of the central dot of the calibration paper to the imaging device to the actual distance of the central dot of the calibration paper to the dot (i, j), specifically denoted as $$\theta_{ij} = \arctan\frac{H}{B \cdot \sqrt{i^2 + j^2}}$$

Of course, since the actual distance of the central dot of the calibration paper to the imaging device, the actual distance of dot (i, j) to the imaging device, and the actual distance of the central dot of the calibration paper to the dot (i, j) are all known, the elevation angle $\theta_{ij}$ can also be calculated using arcsin and arccos.

For each dot (i, j) in the reference image, the proportion coefficient $k_{ij}$ and the elevation angle $\theta_{ij}$ are calculated and then fitted with the image coordinates $(x_{ij}, y_{ij})$, respectively, thereby obtaining fitting results of the function k=g(x, y) and the function θ=h(x, y). For example, considering that image distortion might be centrosymmetric, the image coordinates $(x_{ij}, y_{ij})$ may be transformed into polar coordinates $(r_{ij}, \alpha_{ij})$, where $r_{ij}$ is the distance of the dot (i, j) in the reference image to the image center as the origin and $\alpha_{ij}$ is a rotation angle of a connection line between the dot (i, j) in the reference image and the image center, and then binary polynomial fitting is performed with $[r, r^{-1}, \cos\alpha, \sin\alpha]$ as a dependent variable.

After the function k=g(x, y) and the function θ=h(x, y) are obtained by the fitting, (L, θ, ϕ) as follows can be obtained.

$$L = \frac{a}{\gamma} = \frac{a}{k \cdot w_a} = \frac{a}{g(x, y) \cdot w_a}$$

$$\theta = h(x, y)$$

$$\phi = \arctan\left(\frac{x}{y}\right)$$

where a is the length of the major-axis of the inscribed ellipse and $w_a$ is the pixel number of the major-axis of the inscribed ellipse. A scaling relation of the rectangle ABCD to the inscribed ellipse corresponds to a scaling relation of the image size of the rectangle ABCD to the image size of the inscribed ellipse, and thus, the following can be derived:

$$L = \frac{c}{g(x, y) \cdot w_c}$$

where c is the actual size of the rectangle ABCD that is the 2D code, $w_c$ is the image size of the rectangle ABCD that is the 2D code, and (x, y) is the image position of the rectangle ABCD that is the 2D code. As described above, the image size of the 2D code may be directly measured, or determined using the size of the fitted quadrilateral, or approximated using the size of the detection box of the 2D code.

For ease of expression and subsequent analysis, the spherical coordinates (L, θ, ϕ) may be transformed to orthogonal coordinates as follows.

$$X = L\cos\theta\sin\phi$$

$$Y = L\cos\theta\cos\phi$$

$$Z = L\sin\theta$$

The average error of the spatial coordinates of the 2D code relative to the imaging device that are obtained by the above estimation method from the manually measured spatial coordinates is very small, and experiments have found that it can be within ±1.648 cm.

After the actual position of the 2D code is determined, actual positions of the object and the associated object may be inferred based on the actual position of the 2D code. For example, in the case where the image further contains the object to which the 2D code is attached, the determined actual position of the 2D code relative to the imaging device may be used as an actual position of the object to which the 2D code is attached relative to the imaging device. In the case where the multiple classes of detection targets further include the object, the method 100 may also comprise determining an actual position of the object relative to the imaging device based on the determined actual position of the 2D code relative to the imaging device, and the position of the 2D code in the image and the position of the object in the image that are acquired from the multi-target detection model. In the case where the multiple classes of detection targets further include the object, the method 100 may further comprise, in the case where the image further contains the object having no 2D code attached thereto, determining an actual position of the object having no 2D code attached thereto relative to the imaging device based on the determined actual position of the 2D code relative to the imaging device, and the position of the 2D code in the image and the position of the object having no 2D code attached thereto in the image that are acquired from the multi-target detection model. In the case where the multiple classes of detection targets further include an associated object of the object, the method 100 may further comprise, in the case where the image further contains the associated object, determining an actual position of the associated object relative to the imaging device based on the determined actual position of the 2D code relative to the imaging device, and the position of the 2D code in the image and the position of the associated object in the image that are acquired from the multi-target detection model.

Actual sizes of the object and the associated object may also be inferred based on the actual size of the 2D code. Specifically, in the case where the multiple classes of detection targets further include the object, the method 100 may comprise, in the case where the image further contains the object to which the 2D code is attached, determining an actual size of the object based on the actual size of the 2D code, the size of the 2D code in the image, and a size of the object in the image. The method 100 may also comprise, in the case where the image further contains the object having no 2D code attached thereto, determining an actual size of the object having no 2D code attached thereto based on the actual size of the 2D code, the size of the 2D code in the image, and a size of the object having no 2D code attached thereto in the image. Similarly, the size of the object in the image may be directly measured, or approximately determined by a size of a detection box of the object in the image that is acquired from the multi-target detection model.

In addition, in the case where the multiple classes of detection targets further include an associated object of the object, the method may further comprise, in the case where the image further contains the associated object, determining an actual size of the associated object based on the actual size of the 2D code, the size of the 2D code in the image, and a size of the associated object in the image. Similarly, the size of the associated object in the image may be directly measured, or approximately determined by a size of a detection box of the associated object in the image that is acquired from the multi-target detection model.

One or more of the step S106 for recognizing the 2D code, the step S108 for determining the actual position of the 2D code, and the steps for determining the actual sizes of the object and the associated object may be performed according to detection requirements. When a plurality of steps among the step S106 for recognizing the 2D code, the step S108 for determining the actual position of the 2D code, and the steps for determining the actual sizes of the object and the associated object are performed, the plurality of steps may be performed at least partially in parallel. In some embodiments, after the 2D code is successfully recognized from the cropped image region, one or more of the step S108 for determining the actual position of the 2D code and the steps for determining the actual sizes of the object and the associated object may be performed. In this way, it can be ensured that the basis for calculating the actual position of the 2D code and the actual sizes of the object and associated objects is valid.

In addition, in the case where the image contains a plurality of 2D codes, recognition for each of the plurality of 2D codes may be processed in parallel by using multi-threading based on a detection box of the each of the plurality of 2D codes in the image that is acquired from the multi-target detection model; and determination for an actual position of each of the plurality of 2D codes relative to the imaging device may also be processed in parallel by using multi-threading based on an actual size of the each of the plurality of 2D codes, a size of the each of the plurality of 2D codes in the image, and a position of the each of the plurality of 2D codes in the image that is acquired from the multi-target detection model. In the case where the image contains a plurality of objects or associated objects, after a size of at least one 2D code in the image is obtained, determination of an actual size of each of the plurality of objects or associated objects may be processed in parallel by using multi-threading. In addition, in the case where the image contains a plurality of objects or associated objects, after an actual position and a position of at least one 2D code in the image are obtained, determination of an actual position of each of the plurality of objects or associated objects may be processed in parallel by using multi-threading.

Figure 14:
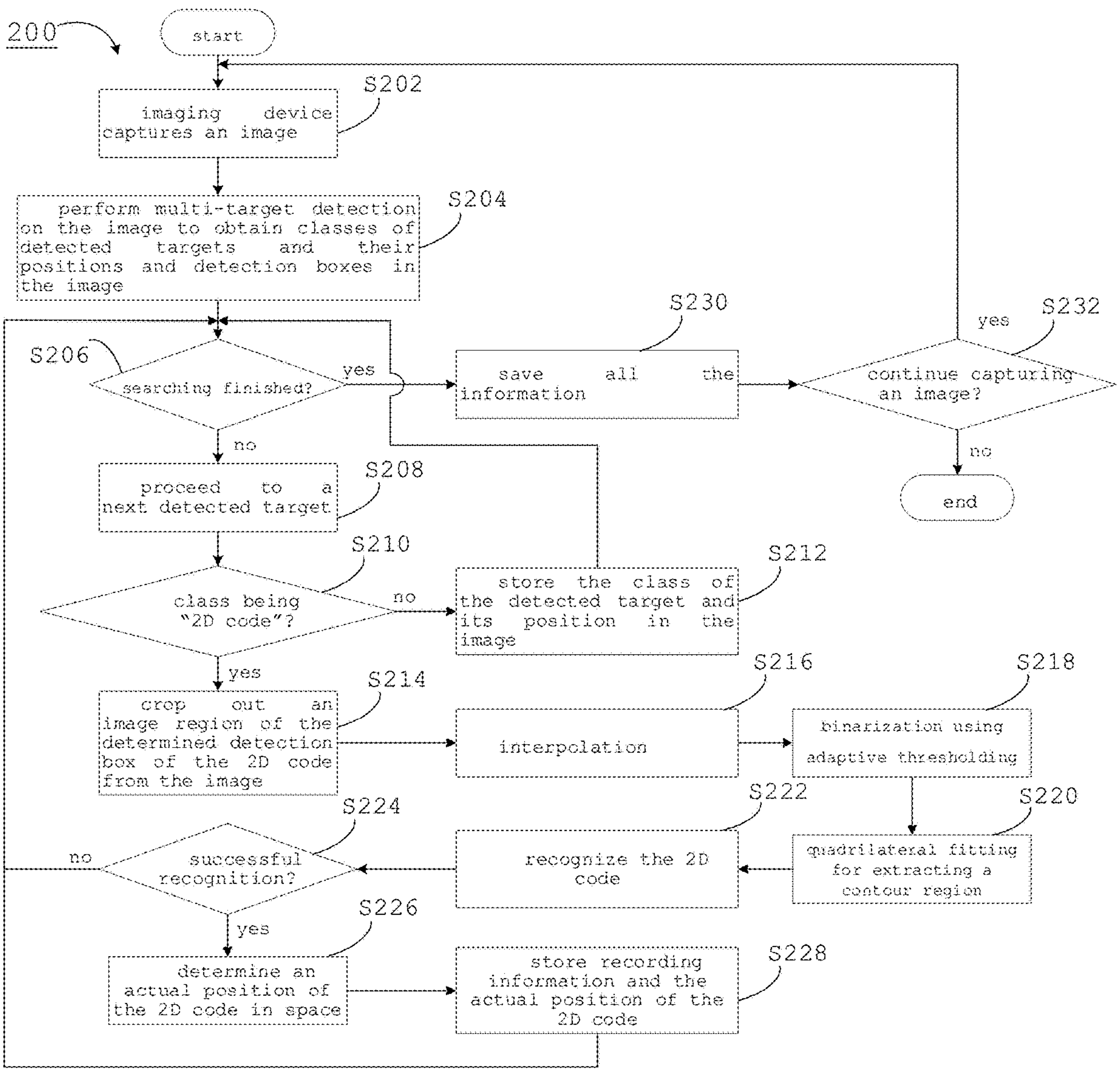
FIG. 14 illustrates a non-limiting example process that applies a detection method according to some embodiments of the present disclosure.

For the purpose of non-limiting illustration, FIG. 14 illustrates an example process 200 that applies the method 100. First, an imaging device captures an image (S202), and then a multi-target detection is performed on the image to obtain classes of detected targets and their positions and detection boxes in the image (S204). As previously described, a class, position, and detection box may be calculated for a 2D code, while only a class and position may be calculated for an object and an associated object without calculating a detection box, thereby improving model inference speed. It is determined if the searching is finished (S206) and the process proceeds to a next detected target (S208) when the searching is not finished (S206 "no"). A detected target is searched. In the case where the class of the detected target is a 2D code (S210 "yes"), an image region of the determined detection box of the 2D code is cropped out from the image (S214), and then interpolation (S216), binarization using adaptive thresholding (S218), quadrilateral fitting for extracting a contour region (S220), and recognition of the 2D code (S222) are performed in sequence. In the case where the recognition is successful (S224 "yes"), it is possible to further determine an actual position of the 2D code in space (S226), and then store recording information and the actual position of the 2D code (S228), and then a next detected target is searched. In the case where the recognition is not successful (S224 "no"), a next detected target is directly searched. In addition, in the case where the class of the detected target is not the 2D code (S210 "no"), the class of the detected target and its position in the image are stored (S212), and then a next detected target is searched. When the search is finished (S206 "yes"), all the information is saved (S230) and whether to continue capturing an image is determined (S232). If capturing an image is continued (S232 "yes"), the above process can be repeated for the newly captured image. If no image is captured any longer (S232 "no"), the process 200 is ended. Because the method 100 has high detection efficiency, the detection result can be output substantially in real time with capturing the image by the imaging device, which facilitates real-time detection and tracking of the 2D code, the object, and the associated object. Therefore, the method 100 can be advantageously applied to fields such as plant protection, product testing, and ecological, entomological, zoological, or environmental studies.

Figure 15:
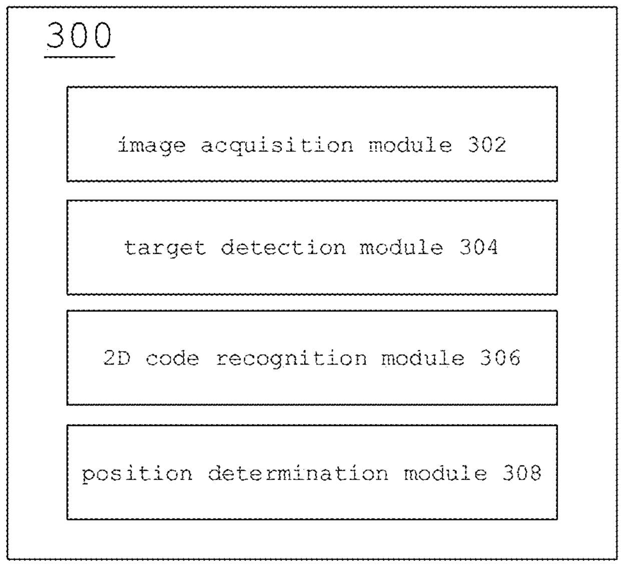
FIG. 15 illustrates a schematic block diagram of a detection apparatus according to some embodiments of the present disclosure.

The present disclosure further provides, in another aspect, a detection apparatus 300 (also referred to as apparatus 300 for short herein). As shown in FIG. 15, the apparatus 300 comprises an image acquisition module 302 and a target detection module 304. The image acquisition module 302 is configured to acquire an image containing a 2D code for attaching onto an object and recording information about the object. For example, various embodiments of the step S102 of the method 100 may be performed by the image acquisition module 302. The target detection module 304 is configured to input the image into a pre-trained multi-target detection model to process the image, the multi-target detection model being configured to detect multiple classes of detection targets including the 2D code. For example, various embodiments of the step S104 of the method 100 may be performed by the target detection module 302. In some embodiments, the apparatus 300 may further comprise a 2D code recognition module 306 configured to, based on a detection box of the 2D code in the image that is acquired from the multi-target detection model, crop out an image region of the determined detection box of the 2D code from the image, and recognize the 2D code from the cropped image region to read the information about the object that is recorded by the 2D code. For example, various embodiments of the step S106 of the method 100 may be performed by the 2D code recognition module 306. Additionally or alternatively, in some embodiments, the apparatus 300 may further comprise a position determination module 308 configured to determine an actual position of the 2D code relative to an imaging device for shooting the image based on an actual size of the 2D code, a size of the 2D code in the image, and a position of the 2D code in the image that is acquired from the multi-target detection model. For example, various embodiments of the step S108 of the method 100 may be performed by the position determination module 308. In some embodiments, the apparatus 300 may further comprise a size determination module (not shown). For example, various embodiments of the steps of the method 100 for determining the actual sizes of the object and the associated object may be performed by the size determination module.

Embodiments of the apparatus 300 are substantially similar to the embodiments of the method 100 described above, so that they are not repeated here, and for the relevant portions, reference can be made to the description of the embodiments of the method 100 described above.

For example, the apparatus 300 may be implemented as a detection apparatus including a processor for executing software modules stored in a memory. These software modules may include one or more of the image acquisition module 302, the target detection module 304, the 2D code recognition module 306, the position determination module 308, the size determination module, and the like that are described above.

Figure 16:
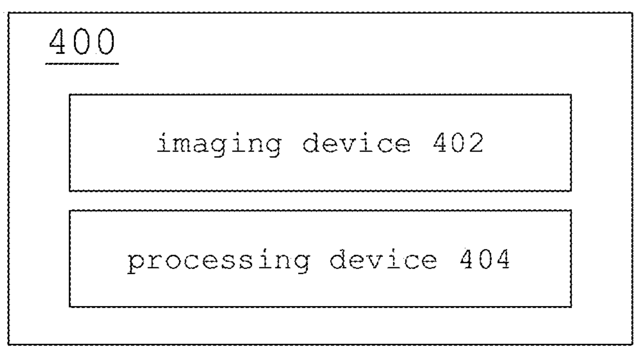
FIG. 16 illustrates a schematic block diagram of an object monitoring system according to some embodiments of the present disclosure.

The present disclosure further provides an object monitoring system. Referring to FIG. 16, an object monitoring system 400 includes an imaging device 402 and a processing device 404. The imaging device 402 is configured to shoot an image for an object. The processing device 404 is configured to perform the method 100 according to any of the embodiments of the present disclosure to monitor the object based on the image shot by the imaging device 402. The object monitoring system 400 may be applied to fields such as plant protection, product testing, and ecological, entomological, zoological, or environmental studies.

Figure 17:
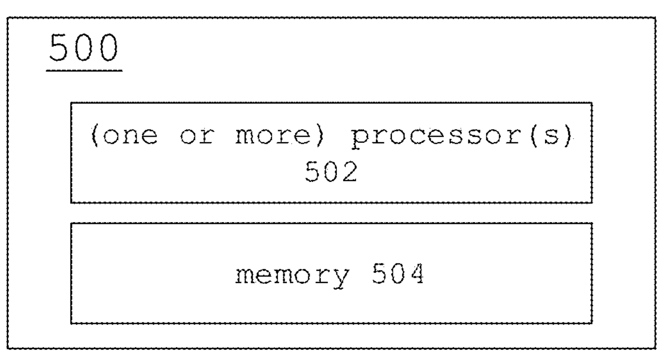
FIG. 17 illustrates a schematic block diagram of a computing device according to some embodiments of the present disclosure.

The present disclosure further provides a computing device, which may include one or more processors and a memory storing computer-executable instructions which, when executed by the one or more processors, cause the one or more processors to perform the method 100 according to any of the embodiments of the present disclosure. As shown in FIG. 17, a computing device 500 may include (one or more) processor(s) 502 and a memory 504 storing computer-executable instructions which, when executed by the (one or more) processor(s) 502, cause the (one or more) processor(s) 502 to perform the method 100 according to any of the foregoing embodiments of the present disclosure. The (one or more) processor(s) 502 may be, for example, a central processing unit (CPU) of the computing device 500. The (one or more) processor(s) 502 may be any type of general-purpose processor, or may be a processor specially designed for performing the method 100 according to any of the embodiments of the present disclosure, such as an application specific integrated circuit ("ASIC"). The memory 504 may include various computer-readable media accessible by the (one or more) processor(s) 502. In various embodiments, the memory 504 described herein may include volatile and nonvolatile media, removable and non-removable media. For example, the memory 504 may include any combination of the following: random access memory ("RAM"), dynamic RAM ("DRAM"), static RAM ("SRAM"), read-only memory ("ROM"), flash memory, cache memory, and/or any other type of non-transitory computer-readable medium. The memory 504 may store instructions which, when executed by the processor 502, cause the processor 502 to perform the method 100 according to any of the embodiments of the present disclosure.

The present disclosure further provides a non-transitory storage medium stored having thereon computer-executable instructions which, when executed by a computer, cause the computer to perform the method 100 according to any of the foregoing embodiments of the present disclosure.

The present disclosure further provides a computer program product, which may comprise instructions that, when executed by a processor, may implement the method 100 according to any of the foregoing embodiments of the present disclosure. The instructions may be any set of instructions that will be executed directly by one or more processors, such as machine code, or any set of instructions that will be executed indirectly, such as scripts. The instructions may be stored in a target code format for direct processing by the one or more processors, or stored in any other computer language, including scripts or collections of independent source code modules that are interpreted as needed or compiled in advance.

The present disclosure improves speed and accuracy of recognition of a 2D code (especially a miniature and/or moving 2D code) by applying a multi-target detection model to the 2D code recognition, enabling real-time detection for an imaging device with a frame rate above 1 fps, while also allowing more information besides the 2D code to be obtained, such as information about an object with or without the 2D code attached thereto and its associated object. The present disclosure improves accuracy and robustness of the recognition of the 2D code (especially the miniature and/or moving 2D code) through interpolation, binarization using adaptive thresholding, and quadrilateral fitting, especially under complex illumination conditions. The present disclosure also accurately estimates three-dimensional spatial coordinates of the 2D code relative to the imaging device from an image of the 2D code (especially the miniature 2D code) with a known actual size by an estimation method based on Euclidean geometric space relations, pinhole imaging theory, and binary polynomial fitting.

As used herein, the word "exemplary" means "serving as an example, instance, or illustration", rather than as a "model" that will be accurately replicated. Any implementation exemplarily described herein is not necessarily to be construed as preferred or advantageous over another implementation. Moreover, this disclosure is not limited by any expressed or implied theory presented in TECHNICAL FIELD, BACKGROUND, SUMMARY OR DETAILED DESCRIPTION.

In addition, for the purpose of reference only, "first", "second", and like terms may also be used herein, and therefore they are not intended to be limiting. For example, the words "first", "second", and other such numerical words that relate to structures or elements do not imply an order or sequence unless clearly indicated in the context. It should be further understood that the term "comprise/include", when used herein, specify the presence of stated features, entireties, steps, operations, units, and/or components, but do not preclude the presence or addition of one or more other features, entireties, steps, operations, units, components, and/or combinations thereof.

In the present disclosure, the term "acquire" and like terms are used broadly for encompassing all ways of obtaining an object, and therefore "acquire a object" includes, but is not limited to, "purchase/order", "prepare/manufacture", "arrange/set", "install/assemble", "design/construct", "measure/detect" the object, and the like.

As used herein, the term "and/or" includes any and all combinations of one or more of associated listed items. The terms used herein is for the purpose of describing specific embodiments only and is not intended to limit the present disclosure. As used herein, the singular forms "a", "an" and "the" are intended to include the plural forms as well, unless otherwise clearly indicated in the context.

In addition, when used in this application, the words "herein", "above", "below", "hereinafter", "hereinbefore", and words with similar meanings should refer to the entirety of this application rather than any specific part of this application. Furthermore, conditional language used herein, e.g., "can", "may", "e.g.", "such as", etc., is generally intended to convey that some embodiments include, while other embodiments do not include, some features, elements, and/or states, unless otherwise expressly stated or understood otherwise in the context used. Therefore, such conditional language is not generally intended to imply one or more embodiments requiring features, elements and/or states in any way, or whether these features, elements and/or states are included or these features, elements and/or states are performed in any specific embodiment.

Those skilled in the art should appreciate that boundaries between the above operations are merely illustrative. Multiple operations may be combined into a single operation, the single operation may be distributed in additional operations, and the operations may be performed at least partially overlapped in time. Moreover, alternative embodiments may include multiple instances of specific operations, and order of the operations may be altered in various other embodiments. However, other modifications, variations, and alternatives are also possible. The aspects and elements of all the embodiments disclosed above may be combined in any way and/or in combination with aspects or elements of other embodiments to provide multiple additional embodiments. Therefore, this description and the accompanying drawings should be regarded illustrative rather than restrictive.

Although some specific embodiments of the present disclosure have been described in detail by way of examples, it should be understood by those skilled in the art that the above examples are for illustration only and are not intended to limit the scope of the present disclosure. The embodiments disclosed herein may be combined arbitrarily without departing from the spirit and scope of the present disclosure. Those skilled in the art should also appreciate that various modifications may be made to the embodiments without departing from the scope and spirit of the present disclosure. The scope of the present disclosure is defined by the attached claims.

What is claimed is:

1. A detection method, comprising:

acquiring an image containing a 2D code for attaching onto an object and recording information about the object;

inputting the image into a pre-trained multi-target detection model to process the image, the multi-target detection model being configured to detect multiple classes of detection targets including the 2D code; and at least one of:

based on a detection box of the 2D code in the image that is acquired from the multi-target detection model, cropping out an image region of the determined detection box of the 2D code from the image, and recognizing the 2D code from the cropped image region to read the information about the object that is recorded by the 2D code; or based on an actual size of the 2D code, a size of the 2D code in the image, and a position of the 2D code in the image that is acquired from the multi-target detection model, determining an actual position of the 2D code relative to an imaging device for shooting the image.

2. The detection method according to claim 1, further comprising, in the case where the image further contains the object to which the 2D code is attached:

determining the position of the 2D code in the image that is acquired from the multi-target detection model as a position of the object in the image; or the multiple classes of detection targets further including the object, and the detection method comprising further acquiring a position of the object in the image from the multi-target detection model.

3. The detection method according to claim 1, further comprising at least one of:

the multiple classes of detection targets further including the object, and the detection method comprising, in the case where the image further contains the object having no 2D code attached thereto, further acquiring a position of the object having no 2D code attached thereto in the image from the multi-target detection model; or the multiple classes of detection targets further including an associated object of the object, the associated object having no 2D code attached thereto, and the detection method comprising, in the case where the image further contains the associated object, further acquiring a position of the associated object in the image from the multi-target detection model.

4. The detection method according to claim 1, further comprising, in the case where the image contains a plurality of 2D codes, performing at least one of:

processing in parallel recognition for each of the plurality of 2D codes by using multi-threading, based on a detection box of the each of the plurality of 2D codes in the image that is acquired from the multi-target detection model; or processing in parallel determination for an actual position of each of the plurality of 2D codes relative to the imaging device by using multi-threading, based on an actual size of the each of the plurality of 2D codes, a size of the each of the plurality of 2D codes in the image, and a position of the each of the plurality of 2D codes in the image that is acquired from the multi-target detection model.

5. The detection method according to claim 1, wherein the recognizing the 2D code from the cropped image region to read the information about the object that is recorded by the 2D code comprises:

performing binarization on the cropped image region;

extracting a contour region of the binarized cropped image region; and reading, from the extracted contour region, the information about the object that is recorded by the 2D code.

6. The detection method according to claim 5, wherein the recognizing the 2D code from the cropped image region to read the information about the object that is recorded by the 2D code comprises:

before the performing binarization on the cropped image region, performing interpolation on the cropped image region to increase a resolution of the cropped image region; and performing binarization on the interpolated cropped image region.

7. The detection method according to claim 5, wherein the performing binarization on the cropped image region comprises:

for each pixel in the cropped image region, determining a threshold for binarizing the each pixel based on values of pixels within a predetermined range around the each pixel, and binarizing the each pixel based on the determined threshold.

8. The detection method according to claim 5, wherein the extracting a contour region of the binarized cropped image region comprises:

fitting a contour region of the binarized cropped image region by a quadrilateral, wherein an angle of each corner of the quadrilateral for fitting the contour region is non-fixed, and wherein a distance between each edge of the quadrilateral for fitting the contour region and the contour region is limited within a predetermined distance range; and using the fitted quadrilateral as the contour region extracted for the binarized cropped image region.

9. The detection method according to claim 8, wherein the reading, from the extracted contour region, the information about the object that is recorded by the 2D code comprises:

applying an m-row n-column grid to the fitted quadrilateral according to an m-row n-column matrix to which the 2D code corresponds;

for each cell in the m-row n-column grid, determining a binarization value of the each cell based on a value of a pixel falling within the each cell;

determining the m-row n-column matrix to which the 2D code corresponds based on the binarization value of the each cell in the m-row n-column grid; and decoding the m-row n-column matrix to read the information about the object that is recorded by the 2D code, wherein m and n are positive integers.

10. The detection method according to claim 9, wherein the m-row n-column grid applied to the fitted quadrilateral is obtained by connection lines between m equal points of a first pair of opposite edges of the quadrilateral and connection lines between n equal points of a second pair of opposite edges of the quadrilateral.

11. The detection method according to claim 1, further comprising, in the case where the image further contains the object to which the 2D code is attached, performing at least one of:

using the determined actual position of the 2D code relative to the imaging device as an actual position of the object relative to the imaging device; or the multiple classes of detection targets further including the object, and the detection method comprising determining an actual position of the object relative to the imaging device based on the determined actual position of the 2D code relative to the imaging device, and the position of the 2D code in the image and the position of the object in the image that are acquired from the multi-target detection model.

12. The detection method according to claim 1, further comprising at least one of:

the multiple classes of detection targets further including the object, and the detection method comprising, in the case where the image further contains the object having no 2D code attached thereto, determining an actual position of the object having no 2D code attached thereto relative to the imaging device based on the determined actual position of the 2D code relative to the imaging device, and the position of the 2D code in the image and the position of the object having no 2D code attached thereto in the image that are acquired from the multi-target detection model; or the multiple classes of detection targets further including an associated object of the object, the associated object having no 2D code attached thereto, and the detection method comprising, in the case where the image further contains the associated object, determining an actual position of the associated object relative to the imaging device based on the determined actual position of the 2D code relative to the imaging device, and the position of the 2D code in the image and the position of the associated object in the image that are acquired from the multi-target detection model.

13. The detection method according to claim 1, wherein the determining the actual position of the 2D code relative to the imaging device for shooting the image comprises:

using a reference image containing a reference object that is shot by the imaging device, based on an image size and an image position of the reference object in the reference image, and a field angle of the reference object relative to the imaging device that is determined by an actual size of the reference object and an actual position of the reference object relative to the imaging device, obtaining, by fitting, a proportion coefficient between the field angle of the reference object relative to the imaging device and the image size of the reference object as a first function of the image position of the reference object, and based on the image position of the reference object and the actual position of the reference object relative to the imaging device, obtaining, by fitting, an elevation angle of a connection line between the reference object and the imaging device relative to a projection of the connection line on a plane where the imaging device is located as a second function of the image position of the reference object; and determining an actual distance of the 2D code relative to the imaging device based on the actual size of the 2D code and a field angle of the 2D code relative to the imaging device that is determined by the first function, the position of the 2D code in the image, and the size of the 2D code in the image, determining an elevation angle of a connection line between the 2D code and the imaging device relative to a projection of the connection line on the plane where the imaging device is located based on the second function and the position of the 2D code in the image, and determining an azimuth angle of the projection of the connection line on the plane where the imaging device is located based on the position of the 2D code in the image, thereby obtaining a spherical coordinate representation of the actual position of the 2D code relative to the imaging device.

14. The detection method according to claim 13, wherein the fitting of the first and second functions is binary polynomial fitting and performed using a polar coordinate representation of the image position of the reference object, and wherein the fitted first and second functions are represented as functions of an orthogonal coordinate representation of the image position of the reference object.

15. The detection method according to claim 1, wherein the multiple classes of detection targets further include the object, and wherein the detection method comprises, in the case where the image further contains the object to which the 2D code is attached:

determining an actual size of the object based on the actual size of the 2D code, a size of the detection box of the 2D code in the image that is acquired from the multi-target detection model, and a size of the detection box of the object in the image that is acquired from the multi-target detection model.

16. The detection method according to claim 1, wherein after the 2D code is successfully recognized from the cropped image region, the actual position of the 2D code relative to the imaging device is determined.

17. An object monitoring system, comprising:

an imaging device configured to shoot an image for an object; and a processing device configured to perform the detection method according to claim 1 to monitor the object based on the image shot by the imaging device.

18. A computing device, comprising:

one or more processors; and a memory storing computer-executable instructions which, when executed by the one or more processors, cause the one or more processors to perform the detection method according to claim 1.

19. A non-transitory storage medium having stored thereon computer-executable instructions which, when executed by a computer, cause the computer to perform the detection method according to claim 1.

20. A detection apparatus, comprising:

an image acquisition module configured to acquire an image containing a 2D code for attaching onto an object and recording information about the object;

a target detection module configured to input the image into a pre-trained multi-target detection model to process the image, the multi-target detection model being configured to detect multiple classes of detection targets including the 2D code; and at least one of a 2D code recognition module or a position determination module, wherein the 2D code recognition module is configured to, based on a detection box of the 2D code in the image that is acquired from the multi-target detection model, crop out an image region of the determined detection box of the 2D code from the image, and recognize the 2D code from the cropped image region to read the information about the object that is recorded by the 2D code, and wherein the position determination module is configured to, based on an actual size of the 2D code, a size of the 2D code in the image, and a position of the 2D code in the image that is acquired from the multi-target detection model, determine an actual position of the 2D code relative to an imaging device for shooting the image.

* * * * *